United States Patent

[11] 3,623,082

[72] Inventors Mark S. Stein
Morton Grove;
Richard F. Maier, Chicago, Ill.; Robert I. Foster, Bountiful, Utah
[21] Appl. No. 40,829
[22] Filed May 27, 1970
[45] Patented Nov. 23, 1971
[73] Assignee C. P. Clare & Company
Chicago, Ill.

[54] KEYBOARD ASSEMBLY
17 Claims, 2 Drawing Figs.

[52] U.S. Cl. .......... 340/365, 340/345
[51] Int. Cl. .......... G08b 11/00
[50] Field of Search .......... 340/345, 347, 365, 166, 172.5, 171

[56] References Cited
UNITED STATES PATENTS

| | | | |
|---|---|---|---|
| 3,088,099 | 4/1963 | Du Vall | 340/345 X |
| 3,495,219 | 2/1970 | Clapp et al. | 340/171 |

*Primary Examiner*—Richard Murray
*Attorney*—Mason, Kolehmainen, Rathburn & Wyss

ABSTRACT: A keyboard assembly for detecting closures in a plurality of switches places in rows and columns to form a matrix or keyboard, each switch representing a distinct data item, includes a signal source continuously operating first and second shift registers in asynchronous relation to each other to provide a distinct register setting for each of the switches. Whenever one of the switches is closed, a control circuit interrupts or arrests the continuous operation of the first and second shift registers in the distinct setting representing the closed switch and shortly thereafter supplies a strobe signal to enable a data utilization device to receive a coded representation of the distinct setting from a read only memory coupled to and controlled by the first and second shift registers.

Figure 1:
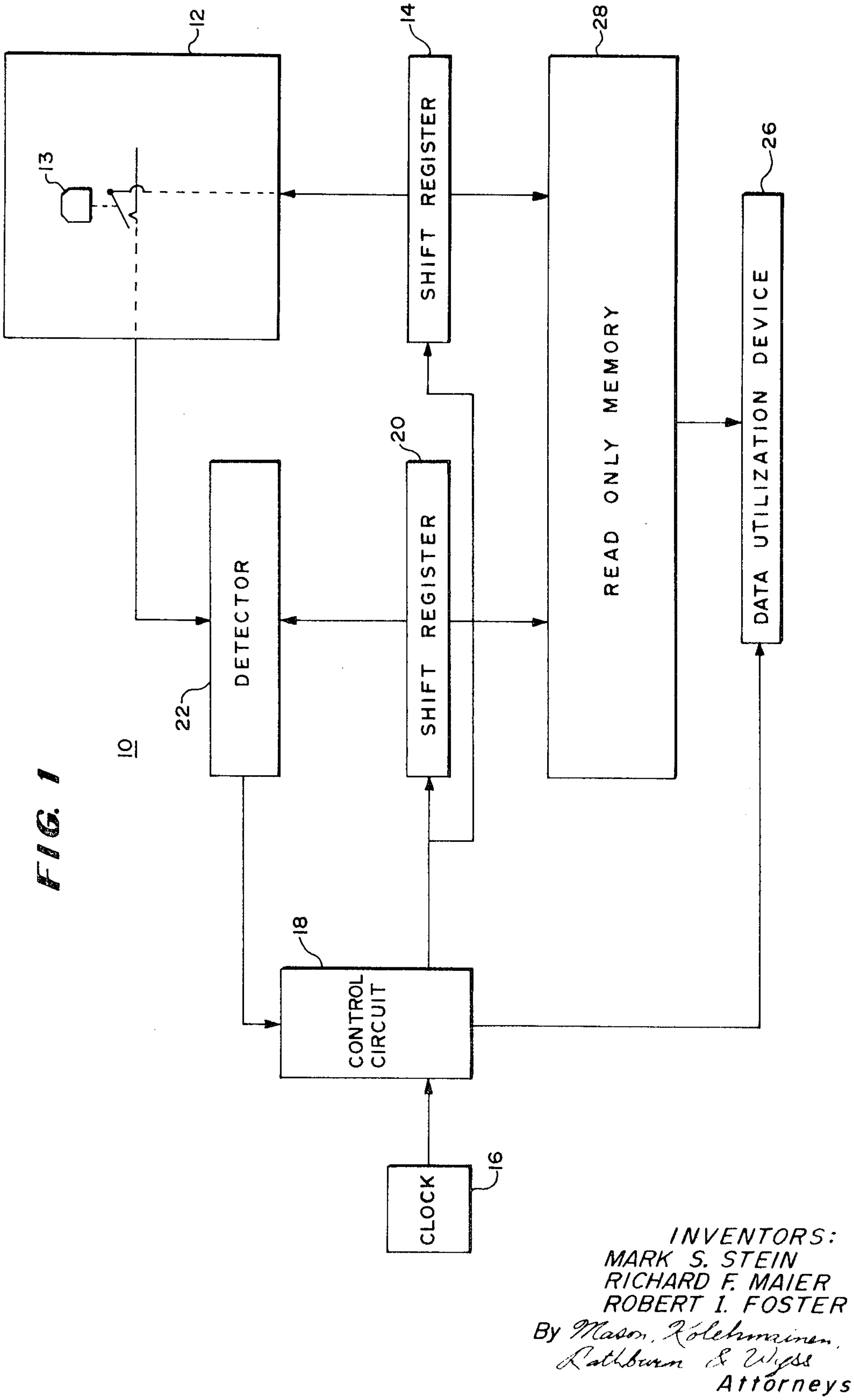

INVENTORS:
MARK S. STEIN
RICHARD F. MAIER
ROBERT I. FOSTER
By Mason, Kolehmainen, Rathburn & Wyss
Attorneys INVENTORS:
MARK S. STEIN
RICHARD F. MAIER
ROBERT I. FOSTER
By Mason, Kolehmainen, Rathburn & Wyss
Attorneys

KEYBOARD ASSEMBLY

This invention relates to a keyboard assembly and, more particularly, to a new and improved scanner circuit for detecting a change in state of a plurality of switches placed in rows and columns to form a matrix or keyboard.

Scanner circuits are used to interrogate groups of randomly operable switches or magnetic cores that are changed in state as representations of distinct data items. As an example, key-operated switches of a keyboard encoder are manually closed representing distinct data items, and the individual switches are sequentially interrogated in the rows and columns of a matrix or keyboard arrangement by a scanning circuit to locate each operated switch. As each operated switch is located, a coded representation of the switch is provided to a data utilization device.

Various circuits have been designed to interrogate the switches in a matrix or keyboard configuration. Some of these circuits interrogate each of the rows of the matrix in sequence by means of a single counting device. If a closed switch in a particular row is detected, the counting device then is reset to interrogate each of the columns to locate the particular row and column associated with the closed switch. However, this type of system entails the time-consuming resetting of the counting device and storing of its setting each time the row scanner detects the closure of a switch and once again when the particular column is located. Other circuits have been designed to only scan the matrix when an individual closure or change of state triggers the counting or scanning device. These complicated scanner circuits are not suitable for systems, such as a keyboard encoder, wherein the individual switch closures might occur as little as 20 milliseconds apart.

Recently, a scanner circuit has been developed to interrogate individually each of the switch closures in a continuous interrogation sequence. However, this circuit requires the encoding of a serial counter for interrogation of the switches in a matrix and the isolation of each switch in the matrix in order for simultaneous switch closures not to affect the interrogation process and the encoding of the data.

Accordingly, one object of the present invention is to provide a new and improved keyboard assembly with a scanner circuit for detecting changes in state representing entered data items.

Another object is to provide a new and improved scanner circuit that provides a sufficiently fast interrogation sequence for closely spaced, randomly entered data items.

A still further object is to provide a manual keyboard assembly including a new and improved scanner circuit that does not require the isolation of the data inputs.

In accordance with these and many other objects, an embodiment of the present invention comprises a keyboard assembly having a plurality of switches arranged in rows and columns to form a matrix, each switch representing a distinct data item, and first and second shift registers continuously operated by a signal source in asynchronous relation to each other in order to provide a different and distinct setting for each of the switches. Whenever one of a plurality of NAND gates forming a detector simultaneously receives a signal from the first shift register through a closed switch and directly from the second shift register, the detector provides a control signal to a control circuit that interrupts or arrests the continuous operation of the first and second shift registers by the signal source in the distinct setting representing the closed switch. Thereafter, the control circuit supplies a strobing signal to enable a data utilization device to receive a coded representation of the data item represented by the closed switch from a read only memory (ROM) which is coupled to and controlled by the first and second shift registers.

Figure 2:
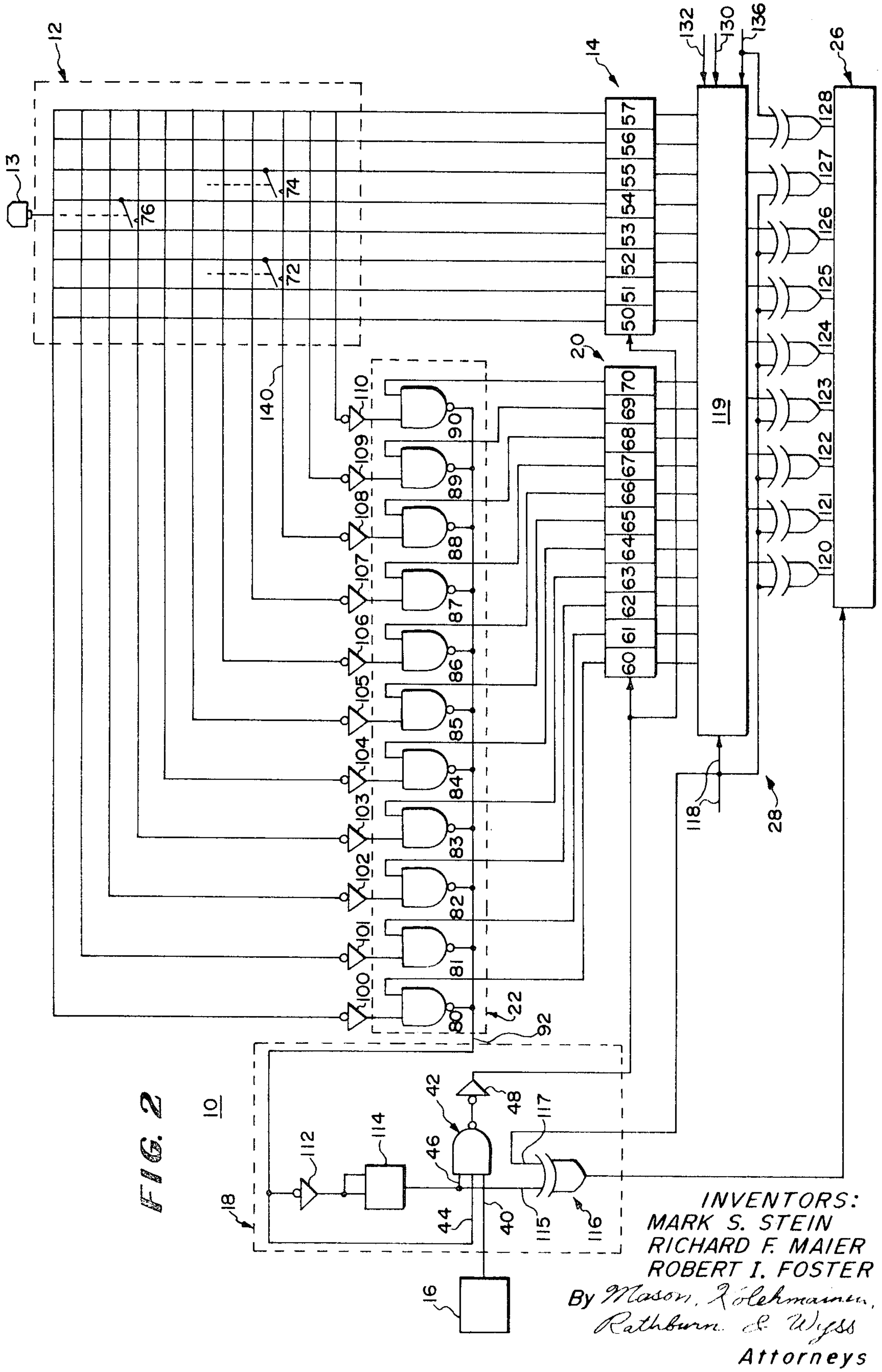

Many other objects and advantages of the present invention will become apparent from considering the following detailed description in conjunction with the drawings in which:

FIG. 1 is a block diagram of a keyboard and scanner circuit embodying the present invention; and FIG. 2 is a logic diagram of the scanner circuit shown in FIG. 1.

Referring now more specifically to FIG. 1 of the drawings, therein is illustrated a keyboard assembly having a scanner circuit which is indicated generally as 10 and which embodies the present invention. The scanner circuit 10 includes a contact or cross-point matrix 12 consisting of rows and columns of switches which are randomly closed by the depression of a key such as a key 13 on a keyboard or any other type of operating mechanism. Coupled to each of the columns in the contact matrix 12 is a shift register 14 which is continuously operated by a clock or signal source 16 coupled to the shift register 14 through a control circuit 18. A shift register 20 also is continuously operated to different settings by the clock 16 in an asynchronous relation to the shift register 14. Considered jointly, the settings of the two registers 14 and 20 provide a different and distinct setting or pattern representing each of the switches.

When a switch in the contact matrix 12 is closed, and the registers 14 and 20 advance to their settings selecting this closed switch, the shift register 14 forwards a signal through the closed switch and the shift register 20 simultaneously supplies an enabling signal to a detector 22. This controls the detector 22 to transmit a signal to the control circuit 18 which inhibits the transmission of signal pulses from the clock 16 to the shift registers 14 and 20 so that the shift registers 14 and 20 are arrested in the distinct setting representing the closed switch. After a specified time delay, the control circuit 18 generates a strobe pulse to enable a data utilization device 26 to receive a coded representation of the switch from a read only memory (ROM) 28 coupled to the shift registers 14 and 20.

The scanner circuit 10 is shown in a logic diagram in FIG. 2 of the drawings wherein the relatively positive potential state of the components is referred to as a high or "1" state, and the relatively low or reference potential state is referred to as low or "0" state. The circuit 10 can be constructed using known discrete logic circuits of a suitable type, such as TTL or DTL, but preferably is formed as a single large-scale integrated circuit. The clock 16 generates a 50 kHz. signal or clock pulse which is transmitted to an input 40 of a NAND-gate 42 in the control circuit 18. Since inputs 44 and 46 of the NAND-gate 42 normally are maintained high, the output of the NAND-gate 42 is driven to a low state as the signal from the clock 16 drives the input 40 high. The output of an inverter 48 whose input is coupled to the output of the NAND-gate 42 is thus driven to a high state so that the shift registers 14 and 20 are continuously sequenced by the signal pulses from the clock 16.

The shift registers 14 and 20 can be of any desired capacity and, as illustrated, the shift register 14 is an eight bit register having eight stages 50–57, and the shift register 20 is an 11-bit register having 11 stages 60–70. Since the shift registers 14 and 20 are operated asynchronously by the pulses from the clock 16, the shift registers 14 and 20 are driven to 88 different and distinct settings which is equivalent to the lowest common denominator of the number of stages in each register. Accordingly, the matrix 12 can contain as many as 88 cross-points connected by normally open switches, such as switches 72, 74, and 76, each of which represents a distinct data item. Although these switches can be of any suitable type, including controlled conduction devices, they preferably are magnetic reed switches selectively actuated by the manual operation of keys in a keyboard assembly, such as a key 13.

The shift register 14 can be constructed to shift a "0" to a "1" through its stages 50–57. If a "0" is shifted through the register, the direct output of each stage 50–57 is coupled to one of eight column input conductors to the matrix 12. Alternatively, if a "1" is shifted through the register 14, an inverted output of each stage is coupled to the column conductors. In this manner, a "0" state potential is applied to the column conductors in sequence as the register 14 is operated by the clock signals.

The register 20 can be similarly constructed, except that the output taken from each of the stages 60–70 normally remains in a "0" state until set. At that time, the output rises to a "1" state. The output from each of the stages 60–70 is connected directly to one input of 11 NAND-gates 80–90 forming the detector 22. All of the normally high outputs of the NAND-gates 80–90 are connected to an output 92 from the detector 22 which is coupled to an input of the control circuit 18. The other input on each of the NAND-gates 80–90 are connected to the individual row conductors of the matrix 12 by 11 inverters 100–110.

As long as none of the switches in the matrix 12 is closed, none of the rows in the matrix 12 is coupled to any of the columns so that none of the 11 inverters 100–110 drives any of the other inputs on the NAND-gates 80–90 high. The inputs 44 and 46 on the NAND-gate 42 likewise remain high, allowing clock pulses from the signal source 16 to be transmitted by the NAND-gate 42 and the inverter 48 to operate the shift registers 14 and 20.

If, however, one of the switches, such as 72, in the matrix 12 is closed to represent a data entry, the control circuit 18 arrests the operation of the shift registers 14 and 20 when this switch is selected by the stages 52 and 68. More specifically, whenever the stage 52 in the shift register 14 provides a low output, the inverter 108 drives one of the inputs of the NAND-gate 88 to a high state because the inverter 108 is coupled directly to the output of the stage 52 through the closed switch 72. The other input to the NAND-gate 88 remains low until the output of the stage 68 in the shift register 20 rises to a high state. Thus, both of the inputs to the NAND-gate 88 are now concurrently enabled.

With both of the inputs to the NAND-gate 88 enabled, the output of the NAND-gate 88 is driven to a low state. Since all of the outputs of the NAND-gates 80–90 are connected directly to the output line 92 from the detector 22, the low output of the NAND-gate 88 drives the input 44 to the NAND-gate 42 to a low level. With the input 44 held low, the gate 42 is inhibited and the output of this gate remains in a constant high state holding the output of the inverter 48 at a low state. Thus, further operation of the shift registers 14 and 20 is inhibited in the distinct setting provided by the stages 52 and 68 representing the switch 72.

The output 92 of the detector 22 is also coupled to the input of an inverter 112 which drives the shorted inputs of a NAND-gate 114 high when the output terminal 92 is driven to a low state. However, the output of the NAND-gate 114 is not placed in a low state whenever the input terminals of the gate 114 are driven high. Rather, the output of the gate 114 only is rendered low when the inputs are maintained high for a specified length of time, for example, a delay time of one millisecond.

Once this specified time delay has elapsed, the output of the gate 114 is placed in a low state, driving the input 46 on the NAND-gate 42 low so that during the period of time in which the output of the gate 114 is low, the output of the gate 42 remains in its "1" state. This provides a fixed duration inhibit supplementing the one directly applied to the input 44. The output of the gate 114 is also coupled to an input 115 to an EXCLUSIVE-OR-gate 116. To provide a positive logic strobe pulse, another input 117 to the gate 116 is maintained in a "1" state by a positive/negative logic control conductor 118 so that the output of the gate 116 is driven to a "1" state by the gate 114 and produces the positive logic strobe pulse. If a negative logic or low strobe pulse is desired, the input 117 is maintained in a low state by the control conductor 118 and the output of the gate 116 is driven low by the gate 114. The high or low output of the gate 116 indicates to or enables the data utilization device 26 to receive a valid coded representation of the closed switch 72 from the ROM 28.

The ROM 28 includes an encoder 119 which contains a plurality of smaller individual encoders and a set of output EXCLUSIVE-OR-gates 120–128. The encoder 119 continuously receives and addresses the outputs of the shift registers 14 and 20 and encodes each of the 88 different combinational settings of the shift registers 14 and 20 into a binary representation of the data item corresponding to the setting. The encoder 119 has a first or normal mode in which 88 distinct inputs can be addressed and encoded by one of the smaller encoders into a binary output. In addition, the encoder 119 has second and third modes activated by mode select control conductors 130 and 132, respectively. Each of the modes is able to address 88 additional inputs and encode the inputs into corresponding binary representations. Accordingly, even though one input matrix 12 having 88 cross-points is used in the scanner circuit 10, a total of 264 distinct data items can be selected and encoded by the scanner circuit 10 by merely selecting the proper mode of the encoder 119 and a corresponding set of data input items to the matrix 12.

The binary representations of the settings of the shift registers 14 and 20 are applied by the encoder 119 to one input to each of the gates 120–127 by selectively driving the inputs to a low state. The other inputs to the gates 120–127 are connected to the positive/negative logic control conductor 118. To provide a positive logic output, the conductor 118 maintains the other inputs to the gates 120–127 high and the output of each of the gates 120–127 rises to a high state when the first input is driven low by the encoder 119. If the negative logic output is desired, the conductor 118 maintains the other inputs on the gates 120–127 in a "0" state so that the output of these gates drops to a low state when the first input is driven low by the encoder 119.

One input of the EXCLUSIVE-OR-gate 128 is coupled to a parity check output of the encoder 119. The other input of this gate is coupled to a positive/negative logic parity check conductor 136 and normally is maintained high so that the output of the gate 128 is driven high to provide a positive logic parity check whenever the parity check output drops to a low state. By maintaining the other input to the gate 128 low, a negative logic parity check may be formed for the coded representation being encoded by the encoder 119. Thus, either positive or negative logic binary representations and parity check can be transmitted to the data utilization device 26.

As long as the switch 72 is closed, the output 92 of the detector 22 inhibits the NAND-gate 42, and the shift registers 14 and 20 remain in the distinct setting allowing the data utilization device 26 to receive a valid coded representation of the closed switch 72. With the shift registers 14 and 20 being arrested as long as the switch 72 remains closed, another switch closure during the time the switch 72 is closed does not affect the coded representation being received by the data utilization device 26. Furthermore, a simultaneous closure of more than one switch does not require the use of complicated circuitry either to determine which switch was closed first or to prevent the mixing of codes for two data items. This is true because the operation of the shift registers 14 and 20 is arrested as soon as any closed switch is interrogated, and the operation of these registers remains arrested until that switch is opened. Thereafter, if the other switch is still closed, the other closure is detected, and a representation of this other closed switch is then sent to the data utilization device 26.

Once the switch 72 is opened, the inverter 108 no longer drives the input to the gate 88 into a "1" state, and the output of the gate 88 returns to its normal high state. The output 92 of the detector 22 returns the input 44 to its "1" state and through the inverter 112 drives the shorted inputs of the gate 114 to a "0" state. The gate 114 returns the input 46 of the gate 42 and the input 115 of the gate 116 to a "1" state so that the data utilization device 26 no longer receives a coded signal from the ROM 28. With the inputs 44 and 46 on the NAND-gate 42 in a high state, the next clock pulse from the signal source 16 coupled to the input 40 is transmitted by the gate 42 and the inverter 48 to again operate the shift registers 14 and 20.

In the event that a switch in the matrix 12 is closed at the time that the shift registers 14 and 20 are driven to the distinct setting associated with the operated switch, the circuit 10 includes means for preventing spurious data entries. For example, if the switch 76 is closed at the time in which the stages 54 and 63 are being driven by a clock pulse from the signal source 16, both inputs to the NAND-gate 83 are driven to a high state, and the output of the gate 83 drops to a low state. The output 92 of the detector 22 drives the input 44 of the NAND-gate 42 to a "0" state so that the sequencing of the shift registers 14 and 20 is inhibited. However, most contact switches that can be used in the matrix 12 have some type of bounce or periodic opening and closing after the switch is actuated. If the switch 76 opens momentarily after the operation of the shift registers 14 and 20 has been inhibited, the inverter 103 no longer drives one of the inputs to the gate 83 high. The output of the gate 83 now returns to its normal high state, and the gate 42 is no longer inhibited, allowing the shift registers 14 and 20 again to be operated.

However, since the NAND-gate 114 does not drive the input terminal 115 of the gate 116 low until the specified time delay has elapsed, the data utilization device 26 does not receive a coded representation of the closed switch 76 from the ROM 28 and no false data entry is made. Thus, as long as the delay time of the NAND-gate 114 is sufficiently long to allow the switch 76 to permanently close, no false closure representations are received by the data utilization device 26.

With the switch 76 now closed and when the shift registers 14 and 20 have again interrogated all of the switches and returned to the distinct setting provided by the stages 54 and 63 representing the switch 76, the operation of the shift registers 14 and 20 is interrupted. The control circuit 18 now enables a coded representation of the switch 76 to be received by the data utilization device 26. Since the clock pulses from the signal source 16 are at a 50 kHz. frequency, the elapsed time between each interrogation of the switch 76 is approximately 1.76 milliseconds so that the small time delay caused by the bounce of the switch 76 does not affect the efficiency of the scanner circuit 10.

The matrix 12 in the scanner circuit 10 does not require the use of a diode, resistance element, or other isolation device in series with each of the switches within the matrix 12. The simultaneous closure of more than one switch in the same row, such as switches 72 and 74, does not affect the operation of the scanner circuit 10 even though such diodes are not used in series with the switches 72 and 74. If, for example, switch 72 is closed and the shift registers 14 and 20 are arrested in the distinct setting provided by the stages 52 and 68 representing the switch 72, the closure of the switch 74 does not affect the low state of the row conductor 140 even though the stage 55 in the shift register 14 is in a high state. This is true because the stage 52 is in a low state and is in parallel with the stage 55. The row conductor 140 remains in a low state as long as the switch 72 is closed to enable the data utilization device 26 to receive a coded representation of the switch 72.

Although the present invention has been described with reference to a single illustrative embodiment thereof, it should be understood that numerous other modifications and embodiments may be devices by those skilled in the art that will fall within the true spirit and scope of the principles of this invention.

What is claimed as new and desired to be secured by Letters Patent of the United States is:

1. A scanning circuit for detecting changes in the state of a plurality of data items, said scanning circuit comprising:
  a plurality of switching means operable in random order, each of said switching means representing one of the distinct data items,
  continuously operable counting means including separate counting portions operated in an asynchronous relation to each other to different and distinct settings, each setting representing one of said switching means,
  output means coupled to and controlled by the counting means for supplying a distinct coded representation for each setting of the counting means, each setting representing one of said data items,
  a detector means coupled to the counting means and controlled by the counting means and the switching means,
  and control means coupled to the detector means and the counting means and controlled by the detector means for arresting operation of the counting means in a setting corresponding to an operated switching means.

2. A scanning circuit as set forth in claim 1 wherein the switching means are placed in rows and columns to form a cross-point matrix.

3. A scanning circuit as set forth in claim 1 wherein each of the switching means is operable by the manual depression of a key on a keyboard unit.

4. A scanning circuit as set forth in claim 1 wherein the separate counting portions are first and second shift registers.

5. A scanning circuit as set forth in claim 2 wherein the separate counting portions are first and second shift registers, said first shift register being coupled to the columns of the said matrix, and said second shift register being coupled to the detector means 6. A scanner circuit as set forth in claim 1 wherein the detector means includes a plurality of NAND gates, the outputs of the said NAND gates being coupled to a common output of the detector means.

7. A scanner circuit as set forth in claim 1 wherein the control means includes a NAND gate coupled to the detector means and interrupting the operation of the counting means.

8. A scanning circuit as set forth in claim 1 including a data utilization device coupled to said output means.

9. A scanning circuit as set forth in claim 8 wherein the control means includes a strobe generator that enables the data utilization device to receive a coded representation of the arrested setting of the counting means from the output means.

10. A scanning circuit as set forth in claim 9 including an input means coupled to said strobe generator and operable to alternate states, one of said states being a potential of one polarity and the other state being a potential of opposite polarity.

11. A scanning circuit as set forth in claim 8 wherein said output means includes
  a read only memory to supply the coded representation for each setting of the counting means,
  and a plurality of output gates coupled to said read only memory to transmit the coded representation to the data utilization device.

12. A scanning circuit as set forth in claim 11 wherein said read only memory includes
  a plurality of encoders,
  and a selecting means to enable one of said encoders to receive and encode the output of said counting means.

13. A scanning circuit as set forth in claim 11 including an output means coupled to said output gates and operable to alternate states, one of said states being a potential of one polarity and the other state being a potential of opposite polarity.

14. A scanning circuit for detecting changes in the state of a plurality of data items and supplying a distinct coded representation of the data items to a data utilization device, said scanning circuit comprising:
  a plurality of switching means operable in random order and placed in rows and columns to form a matrix, each of said switching means representing one of the distinct data items,
  continuously operable counting means including first and second shift registers operated in asynchronous relation to each other to different and distinct settings, each setting representing one of said switching means,
  output means coupled to and controlled by the counting means for supplying the distinct coded representation for each setting of the counting means, each setting representing one of said data items,
  a detector means coupled to the second shift register and to the rows of the matrix and controlled by the setting of the first and second shift registers and the switching means,
  and control means coupled to the detector means and the counting means and controlled by the detector means for arresting operation of the counting means in a setting corresponding to an operated switching means and for enabling the data utilization device to receive the coded representation corresponding to the arrested setting of the counting means.

15. A keyboard assembly comprising:

a plurality of keys, each key representing a distinct data item, a plurality of switching means, each of said switching means controlled by one of said keys, a plurality of conductors arranged in rows and columns, each of said conductors coupled to one of said switching means to form a matrix so that each row conductor is directly connectable to each column conductor by one of said switching means, a first counting means having a plurality of stages, each of said stages being directly coupled to one of said column conductors and being sequentially driven to a reference potential, a detector means having an input directly coupled to each of said row conductors, a second counting means having a plurality of stages, each stage being coupled to another input of said detector means, a control means coupled to the output of said detector means, said control means inhibiting said first and second counting means whenever said detector means simultaneously receives a signal from a stage of said second counting means and a signal of a reference potential from a stage of said first counting means through a closed switching means, and an output means coupled to and controlled by said first and second counting means.

16. A keyboard assembly comprising:

a plurality of randomly operable keys, each of said keys representing a data item, a plurality of switching means, each of said switching means controlled by one of said keys, continuously operable counting means including separate counting portions operated in an asynchronous relation to each other to different and distinct settings, each setting representing one of said keys, output means coupled to and controlled by the counting means for supplying a distinct coded representation for each setting of the counting means, a detector means coupled to the counting means and controlled by the counting means and the switching means, and control means coupled to the detector means and the counting means and controlled by the detector means for arresting operation of the counting means in a setting corresponding to a switching means that has been operated in response to an operated key.

17. A keyboard assembly for detecting and encoding changes in the state of a plurality of data items, said keyboard assembly comprising:

a plurality of switching means operable in random order, each of said switching means representing one of the distinct data items, continuously operable first and second counting means operated to different and distinct settings, each setting representing one of said switching means, said second counting means coupled directly to each of said switching means, output means coupled to and controlled by the first and second counting means for supplying a distinct coded representation for each setting of the first and second counting means, each setting representing one of said data items, a detector means directly coupled to said first counting means and to each of said switching means and controlled by the first and second counting means and the switching means, and control means coupled to the detector means and the first and second counting means and controlled by the detector means for arresting operation of the first and second counting means in a setting corresponding to an operated switching means.

* * * * *